United States Patent [19]

Huss

[11] Patent Number: 4,682,809

[45] Date of Patent: Jul. 28, 1987

[54] CAR BODY

[76] Inventor: Heinrich Huss, Liebigstrasse 2, D 6054 Rodgau 6, Fed. Rep. of Germany

[21] Appl. No.: 805,292

[22] Filed: Dec. 5, 1985

[30] Foreign Application Priority Data

Dec. 5, 1984 [DE] Fed. Rep. of Germany ....... 3444377

[51] Int. Cl.⁴ ............................................. B62D 29/04
[52] U.S. Cl. .................................. 296/31 P; 296/185; 296/188; 296/198
[58] Field of Search ...................... 296/31 P, 185, 186, 296/193–198, 188

[56] References Cited

U.S. PATENT DOCUMENTS

| 3,836,192 | 9/1974 | Wilfert | 296/189 |
| 4,382,626 | 5/1983 | Spooner | 296/31 P |
| 4,396,208 | 8/1983 | Koch | 296/31 P |
| 4,453,763 | 6/1984 | Richards | 296/185 |
| 4,537,441 | 8/1985 | McCleary | 296/31 P |
| 4,555,134 | 11/1985 | Gruna | 296/31 P |

Primary Examiner—Robert R. Song
Attorney, Agent, or Firm—Wenderoth, Lind & Ponack

[57] ABSTRACT

A car body, more especially for an electric vehicle, is proposed as an integrated metal and plastics material component which includes a shell-like body formed from a highly impact-resistant plastics material and provided with an integrated metal chassis, such a body being suitable for the mounting thereon of interchangeable attachment assemblies which are designed in accordance with the intended use of the vehicle. In such an arrangement, the body has a continuous closed base, apart from an opening in its front region; the metal chassis has a means whereby the body may be secured to a front wheel arrangement.

20 Claims, 5 Drawing Figures

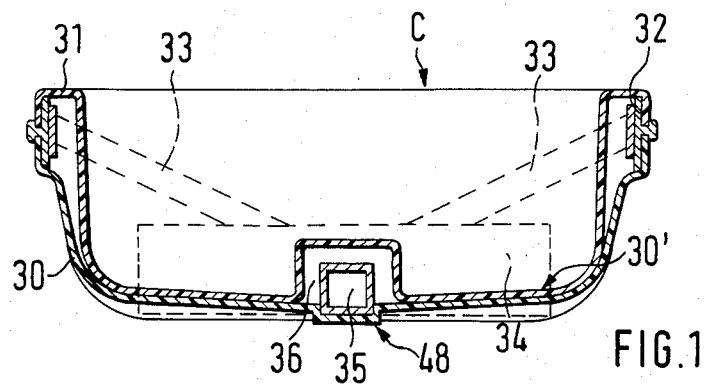
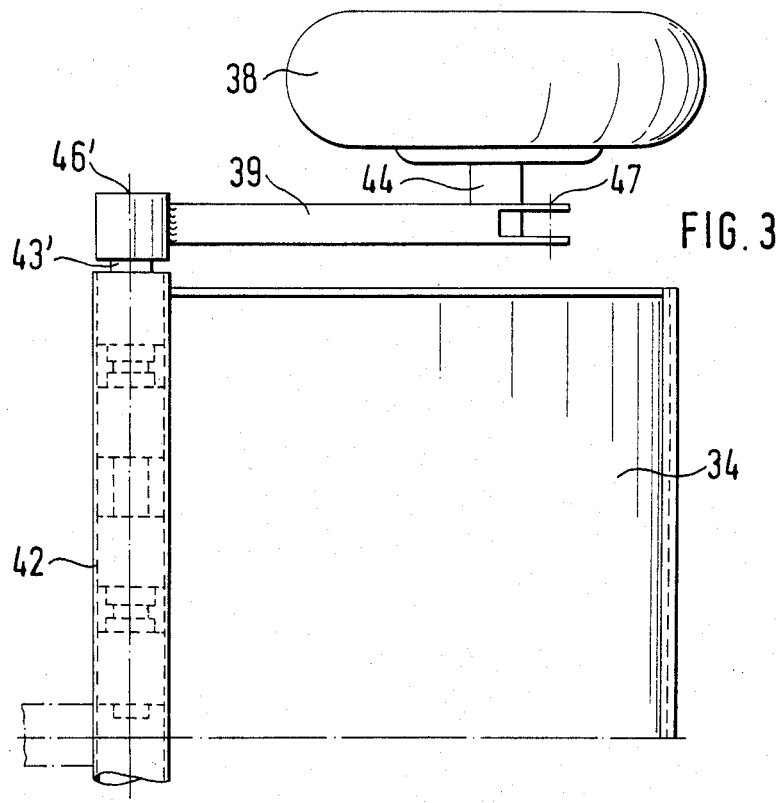

CAR BODY

BACKGROUND OF THE INVENTION

1. Field of The Invention

The invention relates to a car body, more especially for an electric vehicle having wheels which are selectively drivable.

2. Description of the Prior Art

Hitherto-known, battery-powered vehicles are disadvantageous because they only have a very poor travel performance, both in terms of their radius of action per battery charge and in terms of their maximum attainable speed. In addition, they are elaborately constructed and have a disproportionately high mass resulting particularly from the extremely heavy design of such vehicles, wherein the car body or chassis is formed from heavy steel components and includes, as a result thereof, a large number of heavy batteries.

SUMMARY OF THE INVENTION

The basic object of the invention is to provide a car body of the above-described type which is particularly easy to maintain and permits the manufacture of an altogether stable vehicle which complies with road traffic regulations and is designed in an optimum manner from the point of view of operational and manufacturing costs as well as from the point of view of travel performance and travelling properties. Such a car body also overcomes in a most simple manner the serious problems which arise nowadays as, for example, pollution of the environment and undesirable noises.

According to the invention, this object is achieved in that invention provides an integrated metal and plastics material component which includes a shell-like body formed from a highly impact-resistant plastics material and provided with an integrated metal chassis, such body being suitable for the mounting thereon of interchangeable upper body attachment assemblies which are designed in accordance with the intended use of the vehicle. The body has a continuous closed base, apart from an opening in its front region, the metal chassis having a means whereby the body is securable to a controllable front wheel arrangement.

Because of the construction according to the invention, it is possible to provide an electric vehicle, especially one with three wheels, which is noted for being an environmentally-desirable, economical and practical vehicle which is safe in traffic and has a large traveling radius and very good speed of acceleration with low operating costs. In addition, the vehicle which is constructed in this manner has an extremely long service-life, whereby the ratio of its own weight relative to the useful load is considerably improved.

Practical experiments have shown that a vehicle having the car body according to the invention and serving as a multi-seater vehicle or a transporter, weighs considerably less than comparative vehicles, of a similar type and inclusive of batteries and the corresponding performances are considerably superior to those of all hitherto-known electric vehicles. An extremely favorable power-to-weight ratio is also attained, for example, an electric motor with a power of a few kW, which may be supplied with electricity by a plurality of commercially available batteries, provides the vehicle with a much greater traveling radius per energy content of the batteries than is possible with vehicles of a conventional type of construction.

When a highly impact-resistant, expanded or deep-drawn plastics material is used with the metal chassis, with the envisaged reinforcements and with a surrounding profile strip, an extremely torsion-resistant car body is achieved which also resists impacts and shocks, though the latter would in fact considerably damage an otherwise comparable motor vehicle.

When expanded plastics techniques are applied, the mass of expanded plastics material completely surrounds the supporting metal chassis with means of reinforcements and a profile strip and replaces the inner shell and outer shell, wherein this arrangement has moulded-in displacement tubes provided therein for the accommodation of electric leads, cables and the like.

BRIEF DESCRIPTION OF THE DRAWINGS

Additional advantages are described in the following explanation of the invention with reference to one embodiment as shown in the accompanying drawings.

In the drawings:

FIG. 1 is a side elevation view of a car body of the present invention taken along I—I of FIG. 2 with a part of the chassis shown in phantom;

FIG. 3 is a partial plan view looking down on the rear portion of the chassis with the inner and outer shells removed, showing the pivotal arm and rear wheel;

DETAILED DESCRIPTION OF THE PREFERRED EMBODIMENTS

Figure 2:
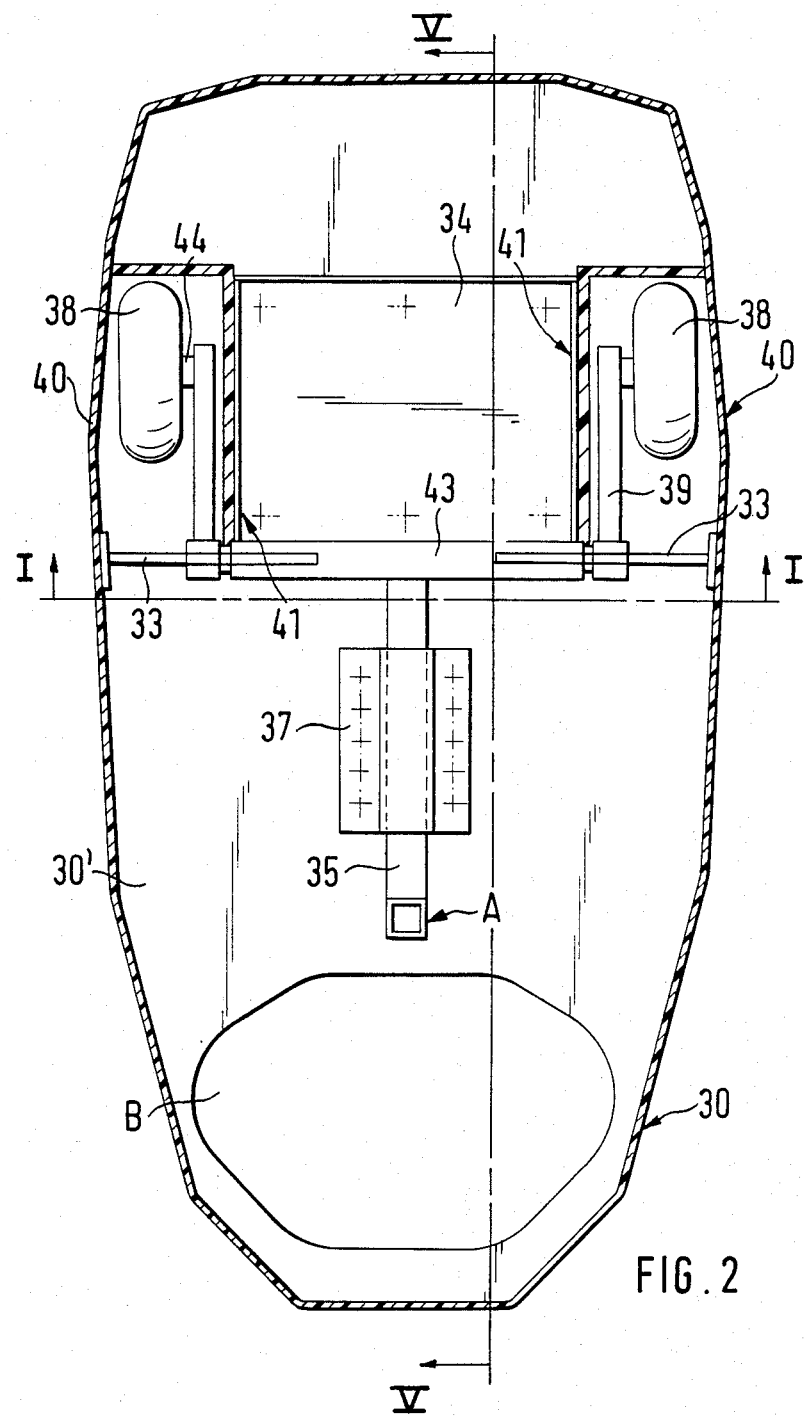
FIG. 2 illustrates the car body of the present invention as viewed from above with the inner shell removed.

FIGS. 1 and 2 show that the chassis, namely a metal carrier member in the embodiment illustrated which comprises a steel trough or a weight receiving and stiffening means comprising an upwardly open metal box, preferably a trough-like recessed portion 34 comprising a rectilinear open metal box having an open top, flat bottom and upstanding walls extending from the bottom and a square metal tube 35 extending laterally therefrom and welded thereto, is secured to an elongated shell 30, formed from a highly impact-resistant plastics material, and with an associated inner shell 31 which is formed from the same material as the outer shell 30. Alternatively, in the case where expanded plastics material techniques are applied, the inner shell 31 and the outer shell 30 are replaced by an expanded plastics material body. In particular, a recessed portion 48 is provided over a substantial region along the center of the base of the outer shell 30, and a first section of the tube 35 rests in said recess 48, said tube 35 being in turn securely connected to the surface of the outer shell 30 via a U-shaped plate 37 by means of suitable connection techniques, such as welding or riveting, for example. The sectional view of FIG. 1, taken between the U-shaped plate 37 and an axle tube 43, also shows that the edges of the two shells or of the expanded plastics material member 30, 31 co-operate with one another and are interconnected by means of a metal, preferably an aluminum profile strip 32. This aluminum profile strip extends fully around the vehicle structure and defines its circumference. The profile strip 32 has an upper and lower channel for receipt of the lower edge of the inner shell 31 and the upper edge of the outer shell 30 and also has a means for retaining decorative strips and/or rubber cushioning strips on a portion thereof extending outwardly from the inner and outer shells.

In FIG. 2, the outer shell 30 is shown with the inner shell 31 removed. The outer shell is made from a plastics material and the horizontal configuration of this shell 30 or of the expanded plastics material body corresponds to the circumferential profile of the vehicle thus equipped. This shell has a continuous base 30', with an opening B being left in its front region for the guidance of a front wheel unit, such as a steering wheel support means (not shown) therethrough, such a unit comprising a steering mechanism, a front wheel suspension and a front wheel drive. The steering wheel support means, which is explained in copending patent application Ser. No. 06/805,293, is secured to means on a free end portion A of a second section of the tube 35 which extends upward in a vertical direction from the first section of the tube 35.

Reinforcing means, such as struts 33, and wheel support means, such as an axle tube 43 which extends transversely between opposite side walls of the shell for receiving two insert axles 43' are welded to the open metal box or to the trough-like recessed portion 34 in the front transverse portion thereof. In such an arrangement, the struts 33 are extended to the profile strip 32, by means of which strip said struts 33 are securely or integrally connected to the outer shell 30 or to the expanded plastics material body and help to increase the torsion resistance of the entire arrangement. As clearly shown in FIG. 1 more particularly, the base of the inner shell 31 or the lower surface of the expanded plastics material body is reinforced by a tunnel 36 formed therein which is open at its lower end and which may accommodate not only the tube 35, but also, if necessary, electric supply leads and brake cables.

The inner shell 31, which is disposed above the outer shell 30, has recesses (not shown) provided in its front lateral regions and also in the rear to permit the required vehicle lighting, position-indicating and brake light components to be accommodated, clamped and retained therein, thereby permitting such components to be mounted extremely rapidly and permitting them also to be replaced in a simple manner if they become damaged, thus securing means are consequently not necessary.

As shown in FIG. 2, wheel boxes are provided in the region of a pair of rear wheels 38 in the outer shell or in the expanded plastics material body. These boxes, which are illustrated by the reference numeral 40, are shaped in a stylized manner and form inner lateral walls 41 adjacent the steel trough 34, so that a recess is provided in the outer shell or in the expanded plastics material body for the securement of the metal trough or the trough-like recessed portion 34 or for such to be embedded in the expanded plastics material body. According to FIG. 1, this trough-like recessed portion 34 can in turn be covered by a trough-shaped moulded member which is integrally connected to and part of the inner shell 31 and serves to accommodate the batteries which are required to operate the electric vehicle. The batteries disposed therein, which may also be provided in a common container, supply power to electric motors which are provided at suitable locations and which, for their part, drive either the front wheel and/or one or both of the rear wheels through the intermediary of an appropriate gear, for example a toothed chain gear (not shown).

Figure 4:
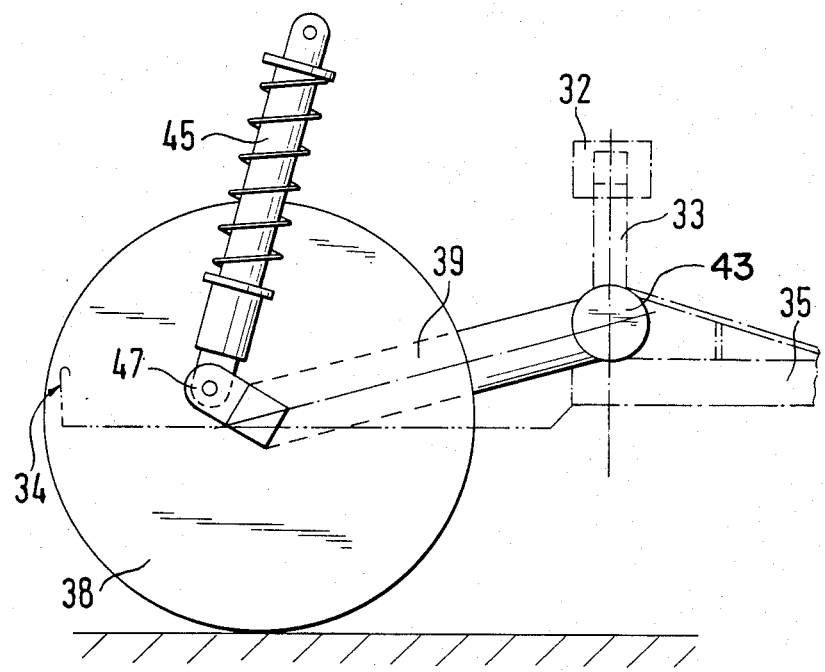
FIG. 4 illustrates the particular arrangement of the rear wheel suspension on the integrated car body.
Figure 5:
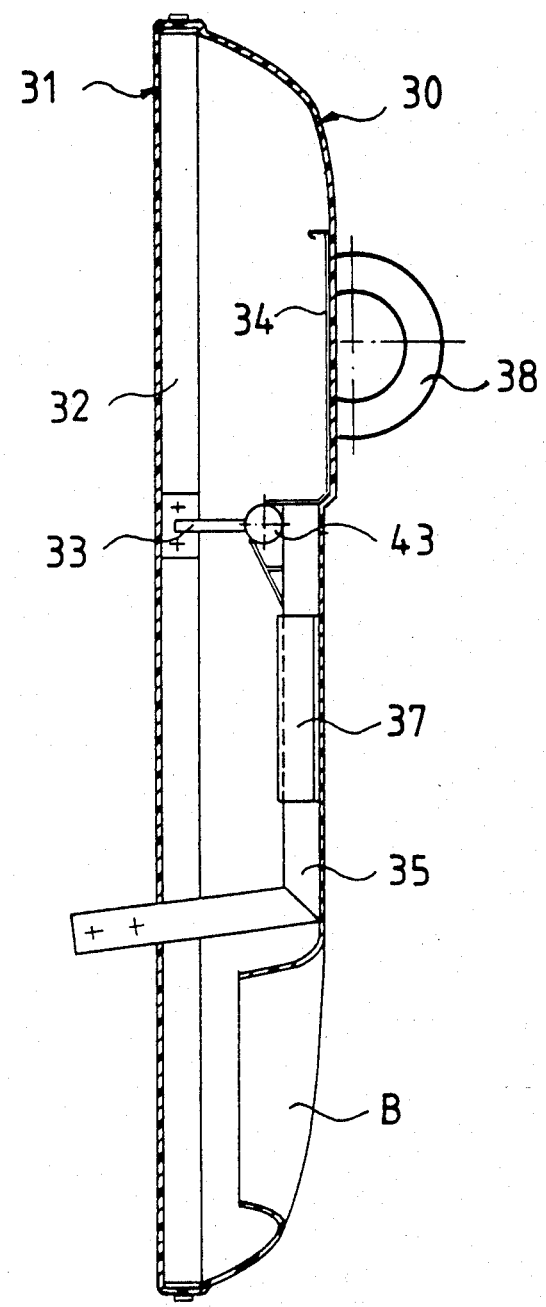
FIG. 5 is a side view of the card body of the present invention taken along V—V of FIG. 2.

The rear wheels 38 are rotatably mounted on support means, such as wheel hubs 44, connected to respective one ends of pivotal arms 39, as shown in FIGS. 2 to 4, which in turn are pivotally connected at the other ends thereof to pivot means integrally connected to opposite sides of the box 34, the pivot means comprising the axle tube 43. Thus, the pivotal arms 39 are pivotally supported by the pivot means with the axes of rotation of the wheels 38 lying in a vertical plane which passes through the box 34. For this purpose, each pivotal arm 39 has an axle 43' extending perpendicularly from an end thereof opposite to an end having an axle supporting a wheel 38 and each insert axle 43' (FIG. 3) has two or more rubber components 42 therearound and is pressed into a respective end of the axle tube 43. Thus, the box 34 is pivotally connected to a pivotal arm 39 which rotatably supports the rear wheel 38 together with its wheel hub or axle 44. Each pivotal arm 39 has a connecting means 47 on a free end thereof which is pivotally connected to one of a resilient means, such as a shock absorber 45 which, in turn, is secured to the shell-like body C by suitable means at the other end thereof. Consequently, the pivotal arm 39 may pivot about a pivotal axis 46' and compress or expand the resilient leg 45, so that corresponding vibrations, which occur during travelling, are cushioned and absorbed.

In addition to the structure, which utilises the two cooperating plastics material shells or the expanded plastics material body with an integrated steel frame, the positioning of the trough-like recessed portion 34 is essential to the invention, as mentioned hereinafter.

The travelling behavior of a vehicle utilizing the car body of the present invention is substantially improved when the batteries are disposed between the pivot axis 46', the rear wheels and the axle tube 43 and when the center of gravity of the batteries is at a low position, with the batteries remaining in their position even in the event of negative acceleration which may result, for example, from collision accidents. The multi-purpose trough-like weight 34 receiving and stiffening means for accommodating the batteries is advantageous, therefore, because it introduces the weight into a chassis, and the plastics material trough of an upper inner shell (not shown) can be provided thereabove. Such a trough can also absorb forces yet electrically insulate the vehicle from the batteries. If necessary, this trough screens the vehicle from the corrosive acids of the batteries. In this arrangement, the batteries are easily accessible by pivoting a cover upwardly, such a cover being pivotally connected to the upper shell and being insulated itself.

A double rear-wheel suspension is provided in order to achieve shock absorbtion in two different manners:

1. by means of a torsional suspension utilising in each case two or more rubber components 42 in the axle tube 43; and 2. by means of the resilient legs 45 which each engage with the free end 47 of the pivotal arm 39 and whose support points are variable.

Protection against overloading of the car body is provided by bilaterally-disposed hard rubber domes (not shown) which serve as stop members and accordingly define the travel stroke of the pivotal arms 39.

Because the batteries are accommodated in an optimum manner, the center of gravity of the vehicle is located so far rearwardly that most of or at least a major portion of the braking power acts on the braking rear wheels 38, with the result that the vehicle is provided with optimum traction and stability and a considerably shortened stopping distance.

Forces are transmitted from the chassis (metal carrier member comprising the steel trough 34 and square tube 35) to the upper shell 31 and lower shell 30 or respectively to the unitary expanded plastics material body through the intermediary of the lightweight metal profile strip 32 which extends all around the vehicle, through the intermediary of the central U-shaped profile plate 37 and through the intermediary of the struts 33. If desired, additional reinforcing struts may be provided to increase reinforcement.

It is highly essential that the shells 30, 31 are formed from a lightweight, highly impact-resistant plastics material or from the integrated expanded plastics material body having a closed surface (as an alternative to an outer and inner shell), each of which protect the component parts of the vehicle. This type of construction is crucial for operating purposes, to protect the car body from forces which result, for example, from accidents. In addition, vibrations which act on the vehicle are absorbed by each individual wheel suspension. The headlamps are mounted without the use of complicated securing means, because these component parts are embedded in the upper shell (not shown) and clamped there, thereby permitting the operation to be carried out in an extremely time-saving and simple manner.

According to the invention, of course, it is highly essential and highly advantageous that the car body can be provided with different attachment assemblies which are adapted to fit over the car body of the invention depending on the particular intended use of the electric vehicle. It is possible to mount and interchange on the car body, for example, an open driver's cab or a closed driver's cab, open or closed charging platforms, an open attachment assembly or a closed attachment assembly for passenger transport or goods conveyance and the like. No special securing means are required here because all of the attachments or assemblies are in formlocking or interchangeable engagement with the car body. Depending on the attachment assembly, therefore, the electric vehicle can be used particularly advantageously as a minibus, a transporter, a waste disposal vehicle, or the like. Furthermore, the vehicle can be converted to fulfil a different purpose without the assistance of technically elaborate means and without a considerable loss of time, with the result that no specialist is required.

In such an arrangement, the car body can have associated therewith an inwardly inclined, protruding front assembly which comprises the instrument panel, the windscreen and the fittings required to operate the vehicle.

An additional advantage resides in the fact that the described car body may also be used for vehicles with rear-wheel drive. By utilising an additional plastics material profile member, a luggage space may also be provided beneath the front bonnet. An expensive and heavy differential is not needed for all types of drive of the vehicle. It is possible to use a plurality of drive control circuits which are independent of one another. Each wheel may be provided with its own independent drive unit.

In addition, because of the overall lightweight construction of the car body, there is a lower consumption of battery capacity.

This means that less energy is consumed whilst maintaining the same speed and the same traveling radius of the vehicle.

All of the batteries are disposed in a separate mobile container which permits the discharged set of batteries to be replaced by a fresh, charged set by a lifting means.

This permits the shutdown times to be very considerably reduced, so that the operating period may be doubled.

In addition, two brake circuits and two power supply circuits (emergency power supply with the lighting and drive), respectively, can be provided so as to be independent of one another.

What is claimed is:

1. An extremely torsion-resistant body construction for a small, lightweight passenger vehicle comprising:
    an elongated shell of highly impact resistant plastics material, said shell having a continuous base and upwardly extending side walls integrally formed with said base;
    a metal chassis secured to said shell, said chassis including weight receiving and stiffening means disposed between opposite side walls of and in contact with said base of said shell, said weight receiving and stiffening means comprising an open metal box having a bottom, upstanding walls and an opening between upper ends of said upstanding walls, said bottom of said box being secured to said base of said shell to form an integrated composite structure therewith; and
    wheel support means secured to said chassis and extending outwardly through said opposite side walls of said shell for supporting wheels having axes of rotation which lie in a vertical plane passing through said box.

2. The body construction of claim 1, wherein said chassis includes a metal tube having a first section extending from a central, lower portion of said box, said tube being secured to said base of said shell and forming an integrated composite structure therewith, said tube having a second section thereof extending upwardly away from said first section at a location spaced from said box, said second section having means on an upper end thereof for attachment to steering wheel support means.

3. The body construction of claim 1, further including a metal profile strip extending completely around an upper, inner portion of said upwardly extending walls of said shell and reinforcing means extending between said profile strip and said box to increase the torsion resistance of said body construction.

4. The body construction of claim 3, wherein said shell comprises an inner shell and an outer shell, said profile strip having an upper channel receiving a lower edge of said inner shell and a lower channel receiving an upper edge of said outer shell.

5. The body construction of claim 1, wherein said wheel support means comprises a pair of pivotal arms, each of said pivotal arms having means for supporting a wheel at one end thereof, pivot means integrally connected to opposite sides of said box, said pivotal arms being pivotally supported by said pivot means whereby said axes of rotation of said wheel lie in a vertical plane passing through said box.

6. The body construction of claim 5, wherein said wheel support means further includes resilient, shock absorbing means connected between each pivotal arm and said shell.

7. The body construction of claim 5, wherein said pivot means comprises an axle tube extending transversely between said opposite side walls of said shell and said pivotal arms each include an axle extending perpendicularly from one end thereof, each said axle being received in said axle tube with at least one rubber component fitted between each said axle and said axle tube.

8. The body construction of claim 1, wherein said shell includes wheel boxes each of which is formed by a portion of one of said opposite side walls of said shell, each of said wheel boxes including an inner lateral wall secured to said box.

9. The body construction of claim 1, wherein said shell includes an opening through said base thereof, said opening being positioned at one end of said shell and said box being located at an opposite end of said shell, said opening being sized for mounting of a front wheel unit therethrough.

10. The body construction of claim 2, wherein said metal tube is rectangular in cross section and said shell includes a recess therein receiving said rectangular metal tube.

11. An extremely torsion-resistant body construction for a small, lightweight passenger vehicle comprising:
   an elongated shell of highly impact resistant plastics material, said shell having a continuous base and upwardly extending side walls integrally formed with said base;
   a metal chassis secured to said shell, said chassis including weight receiving and stiffening means disposed between opposite side walls of and in contact with said base of said shell, said weight receiving and stiffening means comprising an open metal box having a bottom, upstanding walls and an opening between upper end of said upstanding walls, said bottom of said box being secured to said base of said shell to form an integrated composite structure therewith, said metal chassis further including a metal tube having a first section extending from a central, lower portion of said box, said tube being secured to said base of said shell and forming an integrated composite structure therewith, said tube having a second section thereof extending upwardly away from said first section at a location spaced from said box, said second section having means on an upper end thereof for attachment to steering wheel support means;
   a metal profile strip extending completely around an upper, inner portion of said upwardly extending walls of said shell and reinforcing means extending between said profile strip and said box to increase the torsion resistance of said body construction; and
   wheel support means secured to said chassis and extending outwardly through said opposite side walls of said shell for supporting wheels having axes of rotation which lie in a vertical plane passing through said box.

12. The body construction of claim 11, wherein said wheel support means comprises a pair of pivotal arms, each of said pivotal arms having means for supporting a wheel at one end thereof, pivot means integrally connected to opposite sides of said box, said pivotal arms being pivotally supported by said pivot means whereby said axes of rotation of said wheels lie in a vertical plane passing through said box.

13. The body construction of claim 12, wherein said wheel support means further includes resilient, shock absorbing means connected between each pivotal arm and said shell.

14. The body construction of claim 12, wherein said pivot means comprises an axle tube extending transversely between said opposite side walls of said shell and said pivotal arms each include an axle extending perpendicularly from one end thereof, each said axle being received in said axle tube with at least one rubber component fitted between each said axle and said axle tube.

15. The body construction of claim 1, wherein said shell includes wheel boxes each of which is formed by a portion of one of said opposite side walls of said shell, each of said wheel boxes including an inner lateral wall secured to said box.

16. The body construction of claim 11, wherein said shell includes an opening through said base thereof, said opening being positioned at one end of said shell and said box being located at an opposite end of said shell, said opening being sized for mounting of a front wheel unit therethrough, and said metal tube of said chassis is rectangular in cross section and said shell includes a recess therein receiving said rectangular metal tube.

17. The body construction of claim 11, wherein said shell comprises an inner shell and an outer shell, said profile strip having an upper channel receiving a lower edge of said inner shell and a lower channel receiving an upper edge of said outer shell.

18. An extremely torsion-resistant body construction for a small, lightweight passenger vehicle comprising:
   an elongated shell of highly impact resistant plastics material, said shell having a continuous base and upwardly extending side walls integrally formed with said base;
   a metal chassis secured to said shell, said chassis including weight receiving and stiffening means disposed between opposite side walls of and in contact with said base of said shell, said weight receiving and stiffening means comprising an open metal box having a bottom, upstanding walls and an opening between upper ends of said upstanding walls, said bottom of said box being secured to said base of said shell to form an integrated composite structure therewith, said metal chassis further including a metal tube having a first section extending from a central, lower portion of said box, said tube being secured to said base of said shell and forming an integrated composite structure therewith, said tube having a second section thereof extending upwardly away from said first section at a location spaced from said box, said second section having means on an upper end thereof for attachment to steering wheel support means;
   a metal profile strip extending completely around an upper, inner portion of said upwardly extending walls of said shell and reinforcing means extending between said profile strip and said box to increase the torsion resistance of said body construction; and
   wheel support means secured to said chassis and extending outwardly through said opposite side walls of said shell for supporting wheels, said wheel support means including a pair of pivotal arms, each of said pivotal arms having means for supporting a wheel at one end thereof, pivot means integrally connected to opposite sides of said box, said pivotal arms being pivotally supported by said pivot means whereby axes of rotation of said wheels lie in a vertical plane passing through said box, said wheel support means further including resilient, shock absorbing means connected between each pivotal arm and said shell, said pivot means comprising an axle tube extending transversely between said opposite side walls of said shell and said pivotal arms each include an axle extending perpendicularly from one end thereof, each said axle being received in said axle tube with at least one rubber component fitted between each said axle and said axle tube.

19. The body construction of claim 18, wherein said shell comprises an inner shell and an outer shell, said profile strip having an upper channel receiving a lower edge of said inner shell and a lower channel receiving an upper edge of said outer shell.

20. The body construction of claim 18, wherein said shell includes wheel boxes each of which is formed by a portion of one of said opposite side walls of said shell, each of said wheel boxes including an inner lateral wall secured to said box, said shell including an opening through said base thereof, said opening in said shell being positioned at one end of said shell and said box being located at an opposite end of said shell, said opening in said shell being sized for mounting of a front wheel unit therethrough, and said metal tube being rectangular in cross section and said shell including a recess therein receiving said rectangular metal tube.

* * * * *